3,352,924
CARBONYLATION REACTIONS
Elroy Merle Gladrow and William Judson Mattox, Baton Rouge, La., assignors to Esso Research and Engineering Company, a corporation of Delaware
No Drawing. Filed Jan. 23, 1963, Ser. No. 253,266
15 Claims. (Cl. 260—604)

The present invention relates to the preparation of oxygenated organic compounds by the reaction of carbon monoxide and hydrogen with carbon compounds containing olefinic linkages in the presence of a carbonylation catalyst. More specifically, this invention relates to an improved process wherein a novel catalyst is utilized thereby improving yields and eliminating the costly catalyst removal step.

It is well known in the art that oxygenated organic compounds may be synthesized from organic compounds containing olefinic linkages by a reaction with carbon monoxide and hydrogen in the presence of a catalyst containing metals of the iron group such as cobalt and rhodium, preferably cobalt in an essentially three-stage process. In the first stage, the olefinic material and proper proportions of CO and $H_2$ are reacted in the presence of the catalyst to give a product consisting predominantly of aldehydes containing one more carbon atoms than the reacted olefin. The catalyst in the first stage of the process has generally been added in the form of high molecular weight fatty acid salts of the catalytically active metal. These salts are soluble in the liquid olefin feed or in the liquid products from the reaction and have been supplied to the first stage as hydrocarbon solutions or dissolved in the olefin feed. Also it has been proposed to employ catalyst deposited on a carrier, preferably activated with thoria, in the form of a slurry and employ the supported cobalt material in the slurry rather than the metal soap. Regardless of the form of catalyst employed, prior investigations have concluded that the active form of the catalyst utilized in the carbonylation reaction is a metal carbonyl formed by a reversible reaction of the catalyst with the CO and $H_2$ at carbonylation conditions. This theory is supported by the fact that preformed catalysts, obtained by subjecting the metal salt to carbonylation conditions prior to introduction of the olefin feed, have shown a marked reduction in induction time, which is the time required to initiate reaction measured from the instant that reaction conditions are first obtained. Regardless of the form of catalyst used, prior art investigators have found that the oxygenated organic mixture obtained from the first stage of the reaction contained, dissolved therein, compounds such as carbonyls and molecular complexes of the metal catalysts. The organic mixture is therefore treated in a second stage to cause removal of soluble metal compounds from the organic material. This treatment is necessary to remove the metal compounds since they separate out on the catalysts used and plug transfer lines and heat exchangers. This treating has been carried out, for example, by the use of acids or heat. The catalyst-free material is then generally hydrogenated to the corresponding alcohols or it may be oxidized to the corresponding acids.

It is one object of this invention to provide a new and unique catalyst for oxo type reactions.

It is a further object of this invention to provide a novel catalyst which is insoluble in the oxo type reactions and thereby eliminates the need for a catalyst removal step.

Still another object of this invention is to provide a novel catalyst which results in improved conversions of the olefinic starting materials to desirable oxygenated products.

These and other objects are made possible by carrying out the oxo type reactions in the presence of a crystalline alumino-silicate zeolite which via exchange or otherwise, contains the metallic member of the known carbonylation catalysts; for example, rhodium and cobalt, preferably the latter. In general, the metal-containing alumino-silicate zeolites will have an effective pore diameter within the range of 4 to 15 A.; with the large port, e.g. 6 to 15 A., types being preferred. However, exchanged A-type alumino-silicate zeolites which, in the calcium form, have pore diameters of only 5 A. (alumina to silica ratios in the zeolite of about 1.8 to 2.3) may also be used, as well as Mordenite type zeolites. The catalyst employed in the present invention may be formed in accordance with the procedures discussed in detail in U.S. Patent 2,971,903.

As employed in the present specification, the term "large pore zeolites" refers to metallic alumino-silicate zeolites characterized by their highly ordered crystalline structure and having pores of nearly uniform dimensions in the range of about 6 to 15 angstroms. These crystalline zeolites have an alumino-silica anionic cage structure in which the alumina and silica tetrahedra are intimately connected to each other. Metal cations or hydrogen are distributed throughout the structure to maintain electrical neutrality. The highly ordered dispersion of the silica and alumina tetrahedra makes for a large number of active sites, and the uniform pore openings of 6 to 15 angstrom units allow for easy ingress of various hydrocarbon feed types as well as egress of the reaction products which may be formed by contact with the zeolites.

Such large pore zeolites are sometimes referred to as "Type 13" molecular sieves. A naturally occurring example thereof is the mineral faujasite. Synthetically produced alumino-silicates have been termed in the industry "13X" and "13Y" molecular sieves. The chemical formula of the anhydrous, large pore zeolites, expressed in the terms of mols, may be represented as:

$$(0.9\pm0.2)\mathrm{Me}_{2/n}:Al_2O_3:xSiO_2$$

where Me is one or more metal cations, $n$ is its valence, and $x$ is an integer from 2 to 12, preferably 4 to 6. The metal cation is preferably an alkali metal such as sodium or potassium or an alkaline earth metal such as calcium. Normally, it is sodium. The smaller pore zeolites differ principally in having a silica/alumina ratio of 1.8 to 2.3. After exchange with cobalt Me will be principally cobalt.

Generally, these large pore crystalline zeolites are prepared by having present in the reaction mixture, $Al_2O_3$ as sodium aluminate, alumina sol and the like; $SiO_2$ as sodium silicate and/or silica gel and/or silica sol; and alkaline hydroxide, either free or in combination with the above components. Careful control is kept over the pH, the sodium ion concentration of the mix as well as the proportions of silica to alumina and soda to silica, the crystallization period, etc., all in a manner known, per se. A general scheme for preparing large pore crystalline alumino-silica zeolites would be as follows:

Colloid silica, such as commercial Ludox, is mixed with a solution of sodium hydroxide and sodium aluminate at ambient temperatures. The reaction mixture may be allowed to digest at ambient temperatures for periods of up to 40 hours or more, e.g. 24 hours. The reaction mixture is then heated to 180° to 250° F., preferably 200° to 220 F., for a period of 24 to 200 hours or more, preferably 50 to 100 hours in order to effect crystallization. The crystalline metallic alumino-silicate may then be decanted and washed.

The following table sets forth a summary of the molar ratio of reactants normally employed in the synthesis of such large pore molecular sieves.

TABLE I

| Reactants (Mole Ratio) | General Range | Preferred Range for X-Type | Preferred Range for Y-Type |
|---|---|---|---|
| $Na_2O/SiO_2$ | 0.6-2 | 0.7-1 | 0.2-0.8, especially 0.28-0.45. |
| $SiO_2/Al_2O_3$ in reaction mixture. | 2.2-40 | 2.5-5 | 8-30, especially 10-30. |
| $H_2O/Na_2O$ | | | 20-60, especially 30-50. |
| $SiO_2/Al_2O_3$ in crystalline zeolite product. | 2-10 | 2-3 | 4-6, especially 5-6. |

The catalysts of the present invention are formed by exchanging the crystalline alumino-silicate materials with metal salt solutions of cobalt or rhodium normally at temperatures of 80° to 180° F. In general, usually at least about two-thirds of the soda, which may originally be present in the sieve, is exchanged with the catalytic metal so that the ultimate catalyst, for example, anhydrous cobalt alumino-silicate (Y type) catalyst, will contain at least 4 to about 12 wt. percent and preferably 6.5 to 9.0 wt. percent of these metals as the catalytic agent. However, by repeated exchanges with the metal salt solution, it is possible to replace all of the soda originally present in the sieve. Examples of suitable salt solutions for obtaining the present catalyst are the following: Cobaltous chloride, cobaltous nitrate, cobaltous sulfate, cobalt amine complexes, etc. After base exchange with the metal salt solution, the metallic crystalline alumino-silicate should be dried to remove water which may act as a retardant in the carbonylation reaction. Catalyst drying may be accomplished by oven heating at a temperature in the range of 250° to 1000° F. for periods of 1-20 hours to remove the last traces of water.

The sieve catalyst prepared in the manner described above will generally contain 5 to 20% of the exchanged metal in loosely bound form in addition to the exchanged metal bound in the zeolitic structure. This loosely bound metal must be removed prior to the carbonylation reaction in order to have the sieve function as a truly insoluble catalyst. As previously described, the insoluble form of catalyst will have a chemical formula expressed in mols as:

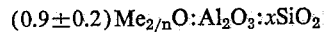

$$(0.9\pm0.2)Me_{2/n}O:Al_2O_3:xSiO_2$$

where Me is the exchanged metal cation, $n$ is its valence and $x$ is an integer from 2 to 12. The catalyst may additionally contain 0 to 40% of the original soda content in the form $Na_2O$. This residual soda content will vary with the exchange conditions utilized and may be completely eliminated, although not essential, by repeated exchanges. Hence, the final form of the catalyst may contain a mixture of cobalt or rhodium with about 0.1 to 50 mol percent, based on the other metal present, of an alkali metal. The removal of loosely bound metal is readily accomplished by flushing the catalyst under carbonylation process conditions with an inert hydrocarbon, for example, heptane. Flushing in this manner causes the removal of metal which would be solubilized by the carbonylation products. In addition, it has been discovered that pretreatment of the catalyst in this manner reduces the induction time, that is, the time needed for the reaction to begin after reaching process conditions.

It is a surprising feature of this invention that the sieve catalysts prepared in accordance with the procedure outlined in the preceding paragraph demonstrate a marked increase in catalytic activity as compared to prior art forms of catalyst utilized in oxo-type reactions. Furthermore, by utilizing the catalyst of this invention it has been unexpectedly discovered that the amount of soluble metal in the product stream of the oxo reaction is less than 1% of the amount of soluble metal previously observed when utilizing the soluble metal soaps as the active catalyst. The negligible amount of soluble metal in the product stream resulting from the use of the sieve catalyst in the oxo reaction makes it unnecessary to subject the product to a demetallizing operation prior to hydrogenation. The elimination of the demetallizing step results in significant savings to the commercial oxo process. While not wishing to be limited to a particular theory, it is presently believed that the active catalyst of the instant invention represents a departure from the soluble metal carbonyl presently thought to be responsible for catalyzing oxo-type reactions. The absence of soluble metal in the product stream indicates that the active metal of the catalyst is "locked" in the crystalline sieve structure and that a metallic zeolite rather than a metallic carbonyl represents the active species of catalyst.

In one preferred embodiment, the catalyst of the instant invention is preformed in a shape desirable for use in either fluid, slurry or fixed-bed operation for the oxonation of olefins. More specifically, the crystalline metal alumino-silicate, for example cobalt alumino-silicate, which measure only about 1–5 microns in size, is composited with silica hydrosol, alumina hydrosol, or a very finely divided clay slurry such as kaolin and dried in the form of microspheres or as beads using procedures of drying well known in the art of catalyst manufacture. In this manner, the catalyst component is imbibed in toto in a porous inert material whose main purpose is to provide bulk to allow larger particle size formation without affecting the catalytic properties of the crystalline component. The composition of the dried composite may vary from about 1 part (by weight) porous diluent/2 parts crystalline catalyst to about 10 parts porous diluent/1 part crystalline catalyst without impairing physical strength and structure. Examples of means of drying the composite may include spray drying to make microspheres, drying in hot oil to make larger size beads and solvent extraction type drying by adding the aqueous slurry to hot alcohols or the like. If desired, the composite slurry may be dried in an oven and then ground and sized.

The carbonylation reaction utilizing the catalyst of this invention, may be carried out under conventional conditions utilizing the known feeds for such processes and provides a particularly attractive method, due to its increased activity, for preparing valuable primary alcohols which find large markets as intermediates for plasticizers, detergents and solvents. The amount of catalyst utilized in the present invention when using a slurry-type operation may vary from 1 to 50 wt. percent based on olefin feed and preferably 3 to 30 wt. percent. Amenable to the reaction are long and short-chain olefinic compounds, depending upon the type alcohols desired. Not only olefins, but most organic compounds possessing at least one non-aromatic carbon-carbon double bond may be reacted by this method. Thus, straight and branched-chain olefins and diolefins, such as propylene, butylene, pentene, hexene, heptene, butadiene, pentadiene, styrene, olefin polymers, such as di- and tri-isobutylene and hexene and heptene dimers polypropylene, olefinic fractions from the hydrocarbon synthesis process, thermal or catalytic cracking operations, and other sources of hydrocarbon fractions containing olefins, may be used as starting material, depending upon the nature of the final product desired.

Generally speaking, the ratio of hydrogen to carbon monoxide in the synthesis gas mixture fed to the first stage is not critical, ratios ranging from 0.5 to 4 being suitable. Preferably, however, synthesis gas mixtures containing about a 1/1 to 2/1 ratio of hydrogen to carbon monoxide are employed. Pressures in a range of 500 to 5,000 p.s.i.g. and temperatures in the range of 150 to 450° F. are generally satisfactory. It is to be understood that the pressures and the temperatures may exceed the ranges set forth herein and that the specific ranges noted are merely examples of the preferred conditions. The ratio of synthesis gas to olefin feed may also vary widely and in general may be maintained between 2,500 and 15,000 standard cubic feet of hydrogen and carbon monoxide per barrel of olefin feed employed.

The liquid oxygenated product obtained from carbonylation in the presence of the catalyst of this invention may be fed directly to a hydrogenation zone where it is hydrogenated under conventional conditions to obtain substantial yields of primary alcohols. Conventional hydrogenation conditions include, for example, a pressure in the range of 2,000–4,000 p.s.i.g. and a temperature in the range of 300° to 550° F. Hydrogenation conditions will vary with the choice of catalyst, nickel, molybdenum sulfide or the like representing conventional choices. Typical hydrogenation conditions may be found in U.S. Patent 2,771,493.

Throughout this specification, unless otherwise indicated, percents are wt. percents.

The process of the present invention is further illustrated by reference to the following examples which are not intended to be limiting thereof:

*Example 1.—Catalyst preparation*

(A) *Sodium alumino-silicate:4.3 $SiO_2/Al_2O_3$ ratio.*—A synthetic alumino-silicate of 4.3 $SiO_2/Al_2O_3$ mol ratio was prepared as follows. A solution of 6.87 kg. of 97% NaOH and 1.51 kg. of sodium aluminate in 27 liters of water was added with stirring to 37.59 kg. of low soda Ludox (30% $SiO_2$) contained in a 20-gallon porcelain crock. Stirring was continued until the mixture was homogeneous. The mixture was heated in a flask under reflux to 176–204° F. for 48 hours to effect crystallization. The aqueous layer was decanted and the crystalline material filtered and water-washed until the wash water had a pH of 9.3. This sodium alumino-silicate analyzed, after oven drying, 14.0% $Na_2O$, 58.6% $SiO_2$, and 23.4 $Al_2O_3$. On a mol basis this corresponds to: 0.99 $Na_2O$:1.00 $Al_2O_3$:4.3 $SiO_2$.

(B) *Sodium alumino-silicate:5.3 $SiO_2/Al_2O_3$ ratio.*—A synthetic sodium alumino-silicate of 5.3 $SiO_2/Al_2O_3$ mol ratio was prepared with the following proportions of reagents. A solution of 300 grams of NaOH and 85 grams of sodium aluminate in 1075 cc. of water was added with stirring to 1930 grams of low soda Ludox contained in a 2-gallon porcelain crock. Stirring was continued until the mixture was homogeneous and the mixture then heated to 210–215° F. for 5½ days to effect crystallization. The aqueous layer was decanted and the crystalline material filtered off and water-washed until the wash water had a pH of 9.5. This sodium form of the catalyst analyzed, after oven drying, 13.7 wt. percent $Na_2O$, 66.8 wt. percent $SiO_2$, and 21.3 wt. percent $Al_2O_3$. On a mol basis this corresponds to: 1.07 $Na_2O$:1.00 $Al_2O_3$:5.3 $SiO_2$.

(C) *Cobalt alumino-silicates.*—The above sodium alumino-silicates were subjected to cationic exchange by contacting 1000 gram portions of the dried (250–300° F.) powder with aqueous cobaltous chloride solutions. Three exchanges were made with each ratio alumino-silicate. The exchanged materials were washed free of chloride ion and oven dried to remove excess water. The following analytical data were obtained on the preparations.

| Preparation | A | B |
| --- | --- | --- |
| $SiO_2/Al_2O_3$ ratio | 4.3 | 5.3 |
| Exchange salt | $CoCl_2$ | $CoCl_2$ |
| No. of exchanges | 3 | 3 |
| Percent Co | 4.1 | 7.8 |
| Percent $Na_2O$ | 3.4 | 6.5 |
| Crystallinity, percent | 28 | 89 |

These data show that the higher $SiO_2/Al_2O_3$ ratio alumino-silicates give the most stable, crystalline catalysts which are more suitable for oxonation reactions.

*Example 2*

The cobalt form of the 13Y type crystalline alumino-silicate, prepared as described in the preceding example (B) and comprising a $SiO_2/Al_2O_3$ ratio of 5.3 was heated at about 662° F. (350° C.) for 16 hours to remove water from the catalyst. The catalyst was pretreated 4 times with $H_2$-CO-heptane mixture to remove any soluble cobalt from the catalyst. Less than 10% of the cobalt content (calculated) was so removed from the catalyst. This may be as residual cobalt salt incorporated in the catalyst. The catalyst as prepared analyzed only 89% theoretical crystallinity by X-ray. So, it also could be the non-crystalline material which was removed in this $H_2$-CO-heptane pretreat. An autoclave was charged with 20 grams of the precalcined and heptane washed cobalt alumino-silicate catalyst. To this was added 100 cc. hexene-1, the autoclave closed and brought to 257° F. (125° C.) and 2,500 p.s.i.g. pressure by application of heat and addition of synthesis gas (mixture of 1 part CO and 1.5 parts $H_2$). After 4 hours, the autoclave was cooled and liquid product withdrawn. Analysis of the product showed 89% conversion of hexene-1 to isomeric heptaldehyde and the concentration of cobalt in the liquid product was less than 6 p.p.m. This low level of dissolved cobalt clearly eliminates the necessity for a separate decobalting step. This example shows further that the solid insoluble cobalt alumino-silicate is the catalyst for the oxonation reaction, and not dissolved cobalt.

*Example 3*

A sample of the cobalt form of the 13Y type crystalline alumino-silicate prepared as described in Example 1(B) was heated to remove water and pretreated with $H_2$-CO-heptane mixture as described in Example 2. This catalyst was composited with a silica hydrogel comprising 3% solids (as $SiO_2$) in an amount to give one part catalyst to 4.6 parts $SiO_2$ on a dry solids basis. The composite catalyst was dried in an oven at 248° F. (120° C.) and then calcined at 662° F. (350° C.) for 16 hours to remove water from the catalyst. Twenty grams of this catalyst was charged to an autoclave, 100 cc. of hexene-1 added, the autoclave closed and brought to 257° F. (125° C.) and to 2,500 p.s.i.g. pressure by application of heat and addition of synthesis gas. After 4 hours the autoclave was cooled and liquid product withdrawn. No difficulty was experienced in separating the liquid product from the residual catalyst in the autoclave. This is due to the larger particle size of the composite catalyst which does not give finely suspended catalyst as was the case in Example 1. Analysis of the product showed about 23% conversion to heptaldehydes and the presence of about 15 p.p.m. cobalt in the liquid product.

*Example 4*

The conventional oxo process with cobalt catalyst is carried out as described in this example.

The conventional oxo catalyst is a preformed solution of dicobalt octacarbonyl in benzene. This is prepared by contacting cobaltous acetate at 3,000 p.s.i.g. with 1.5/1 mol ratio $H_2$/CO synthesis gas at 3,000 p.s.i.g. pressure and 300° F. (1459° C.). Analysis shows about 2 wt. percent cobalt in solution.

For the synthesis, an autoclave of 300 ml. volume was charged with 150 ml. of hexene-1. A portion of the above catalyst solution equivalent to 0.13 wt. percent cobalt based on olefin was added and the autoclave was brought to 257° F. (125° C.) and 2,500 p.s.i.g. pressure with 1.5/1 $H_2$/CO synthesis gas as in Example 2. Pressure was maintained at 2,500 p.s.i.g. for 4 hours by addition of fresh synthesis gas. The autoclave was then cooled and the products removed. The reaction product was decobalted by washing with acidulated water, in which phase the cobalt is soluble. The recovered cobalt is not reusable without considerable additional chemical treatment. Distillation of the decobalted organic phase yields the final purified oxo product. Product yield (corelated) in this case was only 68% aldehydes as compared to 89% for the Co–Y zeolite catalyst in Example 2.

Example 5

A direct comparison of the performance of the catalyst of Examples 2, 3 and 4 can be made by comparing the activities expressed as mols of olefin converted/hr./mol of cobalt present in the over-all system, under the conditions of 257° F. (125° C.) and 2,500 p.s.i.g. total pressure.

| Catalyst of Example: | Act. coefficient [1] |
|---|---|
| 2 | 9.5 |
| 3 | 15.2 |
| 4 | 6+ |

[1] Mol olefin converted/hr./mol Co.

Thus, it can be seen that there is no loss in the intrinsic activity of the catalyst of Example 3 relative to the catalyst of Example 2 because of the $SiO_2$ diluent. The improvements in handling and product recovery because of the large size catalyst particles as taught in Example 3 are such as to make this a preferred catalyst. The improvements in performance as well as handling of the catalysts of Examples 2 or 3 relative to the commercial catalyst of Example 4 are evident.

Example 6

To determine the effectiveness of $H_2$/CO pretreatment, in the presence of non-olefinic hydrocarbons, on Co–Y zeolite activity, two series of oxonation tests were carried out. In one of these the pretreatment of Example 2 was carried out in heptane while in the other the pretreat was omitted and the oxonation made directly on unactivated catalyst with hexene feed. For these tests a Co–Y zeolite embedded or encapsulated in a silica matrix in a weight ratio of 1:3 was used. This type preparation is especially useful for carrying out the oxonation either in fixed-bed or in fluidized solids operations. However, for these comparative tests the catalyst was used as a ground powder in a stirred autoclave. The resulting data are summarized in the following tabulation.

EFFECTS OF $H_2$-CO-HEPTANE CATALYST PRETREAT ON OXONATION OF HEXENE-1

75% $SiO_2$, 25% Co–Y Catalyst (1.6% Co)
Oxonation at 257° F. (125° C.); 2,500
P.s.i.g. Pressure with 1.6 $H_2$/CO Gas; 4 Hrs.

| Oxo Cycle No. | Percent Conversion to Aldehydes | |
|---|---|---|
| | No Catalyst Pretreat | $H_2$-CO-$C_7H_{16}$ Catalyst Pretreat |
| 1 | 4.7 | 28.6 |
| 2 | 13.3 | |
| 3 | 19.8 | |
| 4 | 23.3 | |

The pretreatment of the catalyst was made with 1.6:1 $H_2$/CO synthesis gas at 2,500 p.s.i.g. and 302° F. (150° C.) for four hours. The catalyst was then washed once with hexene-1 preceding the oxonation evaluation.

The above data illustrate the effectiveness of the pretreat in producing a catalyst of high initial oxo activity. Although the same level of activity may be reached without the pretreat during the course of normal oxo operations, the pretreatment has the distinct advantages of:

(1) Reducing induction time. (1 operation vs. 4 cycles of normal oxo operation)

(2) Keeps essentially all of the soluble cobalt out of the oxo product so that decobalting operations are essentially eliminated.

Example 7

A portion of the fresh Co-Y/$SiO_2$ catalyst used in Example 6 was activated for oxo synthesis by three $H_2$—CO—$C_7H_{16}$ pretreats with 1.6:1 $H_2$/CO synthesis gas at 2,500 p.s.i. and 302° F. (150° C.) for four hours. Two oxo synthesis cycles were then made on the activated catalyst using hexene-1 feed and $H_2$/CO synthesis gas at 2,500 p.s.i.g. for four hours. The recovered reaction product contained less than 4 p.p.m. of cobalt, insufficient to effect significant catalytic effects. The Co-Y zeolite catalyst was then removed from the autoclave, rinsed with heptane, and dried at room temperature in vacuum. The recovered catalyst was embedded in both polyethylene and KBr for examination by infrared adsorption. No cobalt carbonyl was present which indicates that the active catalyst species of our invention is the cobalt form of a crystalline zeolite.

In summary, the sieve catalyst utilized in this invention has higher activity, is more easily recoverable, and causes the elimination of a major process step as compared to the conventional carbonylation catalysts taught by the prior art.

The concept of this invention is obviously applicable to a variety of carbonylation reactions, for example the Aldox reaction described in detail in U.S. Patents 2,811,567 and 2,820,067.

In addition, the concept of this invention is particularly applicable to carbonylation-type reactions in which precious metal catalysts are utilized since the loss of catalyst due to solubilization in the liquid products and the inefficiency of demetallizing operations are a bar to commercial operation of such processes.

For example, the bis-oxonation of butadiene to produce difunctional compounds is limited commercially by the fact that rhodium is extremely expensive and the loss of catalyst experienced with the soluble rhodium carbonyl catalysts presently used makes the reaction commercially unattractive. The utilization of a rhodium alumino-silicate catalyst in carbonylation-type reactions as taught by this invention represents a method for solving the catalyst loss problem without adversely affecting product yields.

While the invention has been described with reference to specific embodiments, those skilled in the art will recognize that modifications can be made without departing from the spirit thereof. It is intended that the foregoing description and examples serve merely to illustrate the invention and that the scope thereof be limited solely by the appended claims.

What is claimed is:

1. A process for carbonylation of olefinic compounds comprising carbonylating said olefinic material with carbon monoxide and hydrogen at a temperature in the range of 150 to 450° F. and a pressure in the range of 500 to 5000 p.s.i.g. in the presence of a crystalline metallic alumino-silicate catalyst having a chemical formula represented in terms of mols as:

$$0.9 \pm 0.2 Me_{2/n}O : Al_2O_3 : xSiO_2$$

where Me is a metal selected from the group consisting of cobalt, rhodium and mixtures of each of these metals with 0.1 to 50 mol percent of an alkali metal, $n$ is the valence of the particular metal and $x$ is an integer from 2 to 12.

2. The process of claim 1 wherein $x$ is in the range of 5 to 6.

3. The process of claim 1 wherein said catalyst is thoroughly washed at said carbonylation conditions with sufficient inert hydrocarbon to remove substantially all hydrocarbon soluble material prior to admission of said olefinic material to the reactor.

4. The process of claim 1 wherein said catalyst is composited with from 1 to 10 parts by weight per part of catalyst of a porous diluent selected from the group consisting of silica hydrosol, alumina hydrosol and kaolin.

5. A process for producing an alcohol from an olefin which comprises introducing an olefin to a carbonylation zone, carbonylating said olefin with carbon monoxide and hydrogen at a temperature in the range of 150 to 450° F. and a pressure of 500 to 5000 p.s.i.g. in the presence of a crystalline metallic alumino-silicate catalyst having a chemical formula represented in mols as:

$$0.9 \pm 0.2 Me_{2/n}O : Al_2O_3 : xSiO_2$$

wherein Me is a metal selected from the group consisting of cobalt, rhodium and mixtures of each of these metals with 0.1 to 50 mol percent of an alkali metal, $n$ is its valence and $x$ is an integer from 2 to 12 to obtain an aldehydic mixture, passing said aldehydic mixture directly to a hydrogenation zone and subjecting said aldehydic mixture to hydrogenation at a temperature in the range of 300 to 550° F. and a pressure of 2000 to 4000 p.s.i.g. in the presence of a hydrogenation catalyst for a time sufficient to reduce said aldehydic mixture to alcohol.

6. The process of claim 5 wherein said metallic alumino-silicate catalyst is thoroughly washed with an inert hydrocarbon at said carbonylation conditions prior to admission of said olefin to said carbonylation zone.

7. The process of claim 6 wherein said washed catalyst is composited with 1 to 10 parts by weight per part of washed catalyst of a porous diluent selected from the group consisting of silica hydrosol, alumina hydrosol and kaolin.

8. A process for carbonylation of olefins which comprises introducing an olefin to a carbonylation zone and carbonylating said olefin with carbon monoxide and hydrogen at a temperature in the range of 150° to 450° F. and a pressure in the range of 500 to 5000 p.s.i. in the presence of a crystalline cobalt alumino-silica catalyst having a chemical formula represented in mols as:

$$0.9 \pm 0.2 Me_{2/n}O : Al_2O_3 : xSiO_2$$

where Me represents a mixture of cobalt and 0.1 to 50 mole percent, based on said cobalt, of an alkali metal, $n$ represents the valence of the particular metals and $x$ is an integer from 2 to 12.

9. The process of claim 8 wherein $x$ is in the range of 5 to 6.

10. The process of claim 8 wherein said catalyst is thoroughly washed with an inert hydrocarbon at carbonylation conditions prior to the introduction of said olefin to the carbonylation zone.

11. The process of claim 8 wherein said catalyst is composited with 1 to 10 parts by weight per part of catalyst of a porous diluent selected from the group consisting of silica hydrosol, alumina hydrosol and kaolin.

12. A process for producing an alcohol from an olefin which comprises introducing an olefin to a carbonylation zone, carbonylating said olefin with carbon monoxide and hydrogen, at a temperature in the range of 150 to 450° F. and a pressure in the range of 500 to 5000 p.s.i.g. in the presence of a crystalline cobalt alumino-silicate catalyst having a chemical formula expressed in mols as:

$$0.9 \pm 0.2 Me_{2/n}O : Al_2O_3 : xSiO_2$$

where Me represents a mixture of cobalt and 0.1 to 50 mol percent, based on said cobalt, of an alkali metal, $n$ represents the valence of the particular metal and $x$ is an integer from 2 to 12, to obtain an aldehydic mixture, passing said aldehydic mixture directly to a hydrogenation zone and subjecting said aldehydic mixture to hydrogenation at a temperature in the range of 300 to 550° F. and a pressure in the range of 2000 to 4000 p.s.i.g. in the presence of a hydrogenation catalyst for a time sufficient to reduce said aldehydic mixture to alcohol.

13. The process of claim 12 wherein said cobalt alumino-silicate catalyst is thoroughly washed with an inert hydrocarbon at said carbonylation conditions prior to the introduction of said olefin to said carbonylation zone.

14. The process of claim 13 wherein said inert hydrocarbon is heptane.

15. The process of claim 12 wherein $x$ is in the range of 5 to 6 and said crystalline catalyst is composited with 1 to 10 parts by weight per part of catalyst with a porous diluent selected from the group consisting of silica hydrosol, alumina hydrosol and kaolin.

References Cited

UNITED STATES PATENTS

| 2,548,159 | 4/1951 | Houtman et al. |
| 2,562,980 | 8/1951 | Atwell. |
| 2,880,241 | 3/1959 | Hughes _____ 260—604 |
| 2,908,721 | 10/1959 | Cull et al. _____ 260—604 XR |
| 3,013,990 | 12/1961 | Breck et al. _____ 252—455 |

LEON ZITVER, *Primary Examiner.*

BERNARD HELFIN, *Examiner.*